(12) United States Patent
Rice et al.

(10) Patent No.: US 6,776,328 B2
(45) Date of Patent: Aug. 17, 2004

(54) RADIATION ASSISTED FRICTION WELDING

(75) Inventors: Robert R. Rice, Simi Valley, CA (US); Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 10/245,016

(22) Filed: Sep. 17, 2002

(65) Prior Publication Data

US 2004/0050906 A1 Mar. 18, 2004

(51) Int. Cl.[7] .............................................. B23K 20/12
(52) U.S. Cl. .................................... 228/112.1; 228/2.1
(58) Field of Search ............................. 228/112.1, 2.1, 228/2.3, 114; 148/415, 535, 621, 690, 559, 565; 428/544, 615; 403/271; 156/580; 219/163, 164, 121.85

(56) References Cited

U.S. PATENT DOCUMENTS

| | | | |
|---|---|---|---|
| 5,165,589 A | | 11/1992 | Nied et al. |
| 5,240,167 A | | 8/1993 | Ferte et al. |
| 5,460,317 A | | 10/1995 | Thomas et al. |
| 5,469,617 A | | 11/1995 | Thomas et al. |
| 5,595,670 A | | 1/1997 | Mombo-Caristan |
| 5,697,544 A | * | 12/1997 | Wykes ....................... 228/2.1 |
| 5,718,366 A | | 2/1998 | Colligan |
| 5,829,664 A | | 11/1998 | Spinella et al. |
| 5,893,507 A | * | 4/1999 | Ding et al. .................. 228/2.1 |
| 6,168,067 B1 | * | 1/2001 | Waldron et al. ......... 228/112.1 |
| 6,191,379 B1 | | 2/2001 | Offer et al. |
| 6,264,088 B1 | * | 7/2001 | Larsson ...................... 228/2.1 |
| 6,516,992 B1 | * | 2/2003 | Colligan .................. 228/112.1 |
| 6,543,671 B2 | * | 4/2003 | Hatten et al. ............. 228/112.1 |
| 6,554,175 B1 | * | 4/2003 | Thompson ............... 228/112.1 |
| 2003/0098335 A1 | * | 5/2003 | Saeki et al. .............. 228/112.1 |
| 2003/0111515 A1 | * | 6/2003 | Scheglmann et al. ..... 228/112.1 |
| 2003/0116608 A1 | * | 6/2003 | Litwinski ................. 228/112.1 |
| 2004/0057782 A1 | * | 3/2004 | Okamoto et al. ........... 403/271 |

FOREIGN PATENT DOCUMENTS

| | | |
|---|---|---|
| EP | 0 810 056 A3 | 12/1998 |
| EP | 1 334 793 A | 8/2003 |
| JP | 10 225781 A | 8/1998 |
| JP | 2000 301361 A | 10/2000 |
| JP | 2001138073 | 5/2001 |
| WO | WO99/39861 A1 | 8/1999 |
| WO | WO02/07924 A1 | 1/2002 |

\* cited by examiner

*Primary Examiner*—Kiley Stoner
*Assistant Examiner*—Jonathan Johnson
(74) *Attorney, Agent, or Firm*—Alston & Bird LLP

(57) ABSTRACT

There are provided an apparatus and method for friction welding structural members. The apparatus includes a connected shank and probe. The probe defines an absorption surface and a cavity extending thereto. The absorption surface is configured to receive electromagnetic radiation from an electromagnetic radiation source such as a light source or RF generator. The radiation heats the probe, supplementing the heat generated by friction between the probe and the structural members, and thereby increasing the speed at which the probe can be used to frictionally weld the structural materials.

32 Claims, 3 Drawing Sheets

RADIATION ASSISTED FRICTION WELDING

BACKGROUND OF THE INVENTION

1) Field of the Invention

The present invention relates to friction welding and, in particular, relates to an apparatus and method for using electromagnetic radiation to provide heat during friction welding.

2) Description of Related Art

Friction welding, as is known in the art, typically includes generating a frictional force between a tool and a workpiece comprising one or more structural members to form a plasticized region of the structural members, in which the materials of the structural member are plasticized, mixed, and thereafter cooled to form a friction weld joint. In one conventional method, the tool is a rotary tool such as a friction stir welding tool, which includes a rotatable shank and pin. The shank and pin are rotated, and the pin is urged into one of the structural members or into an interface between adjacent structural members. As the pin rotates, friction between the pin and the structural members heats the structural members and forms a plasticized region, in which the materials of the structural members become plastic but generally not melted. The rotational motion of the pin also mixes the materials of the structural members in the plasticized region. The pin is translated through the structural members or along the interface to form a linear friction stir weld joint. In another conventional method, the friction welding tool is reciprocated instead of rotated.

Friction welding can provide strong and reliable weld joints and can be used with a variety of materials, such as steel, titanium, aluminum, and alloys thereof, some of which are difficult to join by other welding methods such as arc welding. Thus, friction welding provides an alternative to other types of welding as well as fasteners, such as screws, bolts, rivets, and the like. The speed and, hence, the cost effectiveness of friction welding, however, is limited by the speed at which the tool is translated through the structural members. If the tool is translated too quickly, the frictional heat generated between the tool and the structural members will not be sufficient to plasticize the structural members, decreasing the quality of the resulting weld joint. Thus, the translational speed of the tool is generally limited by the rate at which frictional heat is generated between the tool and the structural members.

One proposed method of friction welding includes providing additional heat to the structural members to supplement the frictional heating achieved by the friction welding tool. For example, an electric current can be passed through the structural members, resulting in resistive heating in the structural members. Alternatively, induction heaters or lasers can be used to heat the structural members. However, the effective heating that results in the structural members can vary according to the characteristics of the individual structural members. For example, the resistance, inductance, and surface reflectance of the structural materials can affect the amount of heating that occurs from resistive heating, inductive heating, and laser heating, respectively. Additionally, the heating may not be limited to the immediate region of the weld joint but may affect a larger region of the structural members, sometimes referred to as a "heat affected zone," which is characterized by adverse material properties, such as increased brittleness, caused by heating. A large heat affected zone caused by the additional heating reduces the quality of the weld joint and can require additional processing to restore the initial material properties.

Thus, there exists a need for a friction welding apparatus and method for forming strong and reliable friction weld joints in a variety of materials. The apparatus and method should provide heat to the structural members to supplement the frictional heat generated between the friction welding tool and the structural members and thereby increase the maximum welding speed. The apparatus and method should also provide consistent heating of different structural members and allow the heating to be limited to a particular area of the structural members.

SUMMARY OF THE INVENTION

The present invention provides an apparatus for friction welding at least one structural member. The apparatus includes a shank and a probe that is connected to the shank. The probe is configured to be actuated by the shank for friction welding the at least one structural member. At least one of the shank and probe defines an absorption surface and a cavity that extends thereto. The absorption surface is configured to receive electromagnetic radiation from an electromagnetic radiation source for heating the probe. The absorption surface can be internal and/or oblique to a direction of the electromagnetic radiation received from the electromagnetic radiation source. The absorption surface can also be curved and/or conical. According to one aspect of the invention, the probe defines at least one aperture extending through the absorption surface such that electromagnetic radiation can propagate from the cavity through the aperture and impinge on the structural member.

The apparatus can also include the electromagnetic radiation source, which is configured to irradiate the absorption surface and thereby heat the probe and the structural members. The electromagnetic radiation source can be a light source or a radio frequency generator, and a fiber optic cable or a waveguide can be provided for directing the radiation toward the absorption surface. The cavity can extend in a longitudinal direction of the probe, and the electromagnetic radiation source can be configured to emit electromagnetic radiation in the longitudinal direction of the probe.

According to one aspect of the invention, the probe is a friction stir welding pin, and the apparatus includes a rotatable actuator in rotational communication with the shank such that the rotatable actuator can rotate the shank about a longitudinal axis of the probe. According to another aspect, the probe is a friction stir welding blade, and the apparatus includes a reciprocatable actuator in reciprocatable communication with the shank.

The present invention also provides a method of friction welding at least one structural member. The method includes providing the at least one structural member, which can be formed of a material that plasticizes at a temperature of at least 800° C. A friction welding probe is urged into the at least one structural member and actuated to frictionally weld the at least one structural member. An absorption surface of a shank in thermal communication with the probe is irradiated with electromagnetic radiation, such as light or radio frequency radiation, thereby heating the probe. For example, the light can be directed in a direction oblique relative to the absorption surface. The at least one structural member can be heated to a temperature of at least 800° C.

According to one aspect of the invention, the probe is a friction stir welding pin, which is rotated about a longitudinal axis, and electromagnetic radiation is directed in the longitudinal direction of the pin and toward the pin. According to another aspect, the probe is a friction welding blade, which is reciprocated in an interface defined by the at least one structural member.

BRIEF DESCRIPTION OF THE DRAWINGS

Figure 1:
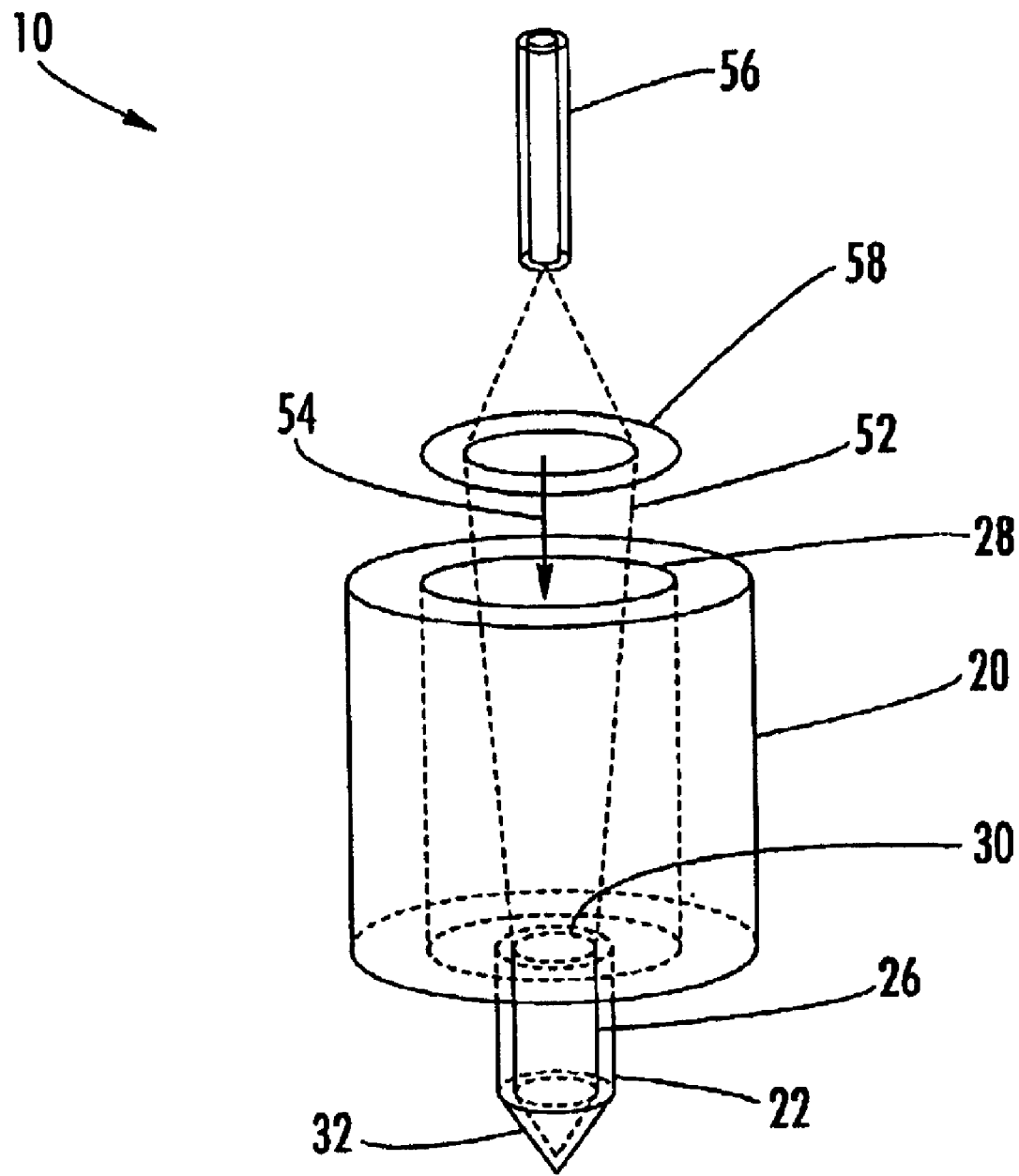
Figure 2:
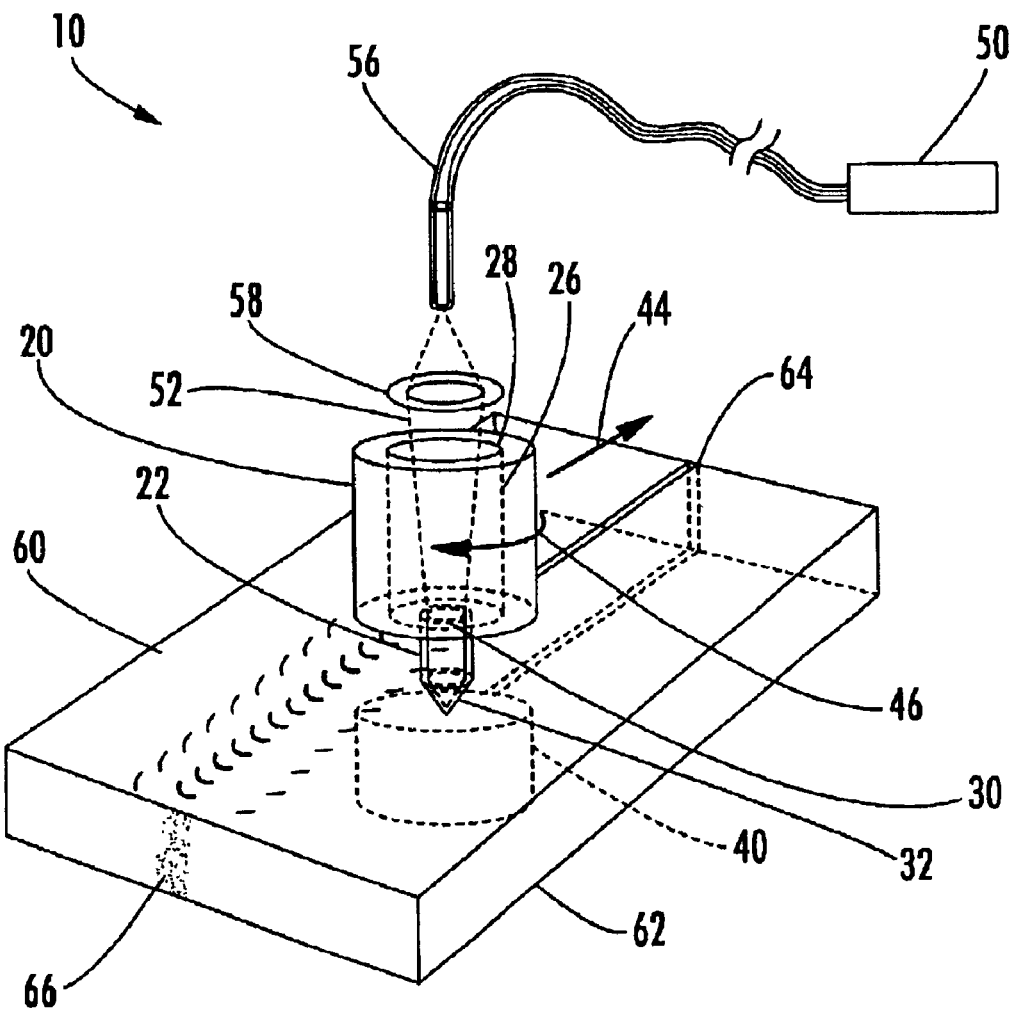
Figure 3:
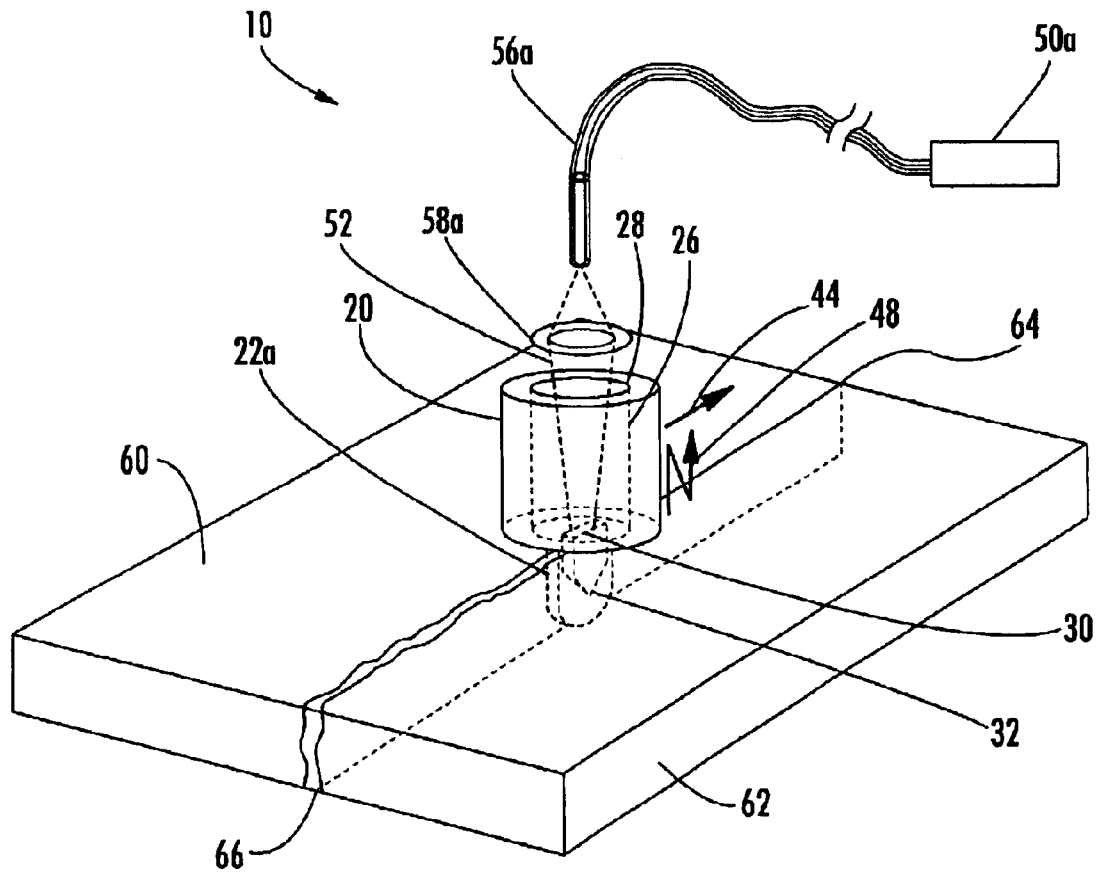

Having thus described the invention in general terms, reference will now be made to the accompanying drawings, which are not necessarily drawn to scale, and wherein:

FIG. 1 is a perspective view of a friction welding tool according to one embodiment of the present invention;

FIG. 2 is a perspective view of the friction welding tool of FIG. 1 configured to form a friction stir weld joint for joining two structural members according to one embodiment of the present invention; and FIG. 3 is a perspective view of a reciprocatable friction welding tool configured to form a friction weld joint for joining two structural members according to another embodiment of the present invention.

DETAILED DESCRIPTION OF THE INVENTION

The present invention now will be described more fully hereinafter with reference to the accompanying drawings, in which preferred embodiments of the inventions are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is illustrated a friction welding tool 10 according to one embodiment of the present invention. The friction welding tool 10 includes a shank 20 and a probe 22, such as a friction stir welding pin, attached thereto. As described below, the probe 22 defines an internal absorption surface 32 that defines part of a cavity 26, which extends at least through the shank 20. The absorption surface 32 is configured to receive electromagnetic radiation, such as light directed through a fiber optic cable 56 along a beam path 52 in a propagation direction 54 as shown.

In FIG. 2, the friction welding tool 10 is shown configured to join two structural members 60, 62. The structural members 60, 62 are positioned to abut each other to form an interface 64 therebetween. In the illustrated embodiment, the interface 64 between the structural members 60, 62 is parallel to a longitudinal axis of the probe 22, but the structural members 60, 62 can be positioned in other configurations. For example, the structural members 60, 62 can be overlapped and positioned so that the interface 64 extends generally perpendicular to the longitudinal axis of the probe 22, and so that the probe 22 extends through the first structural member 60, through the interface 64, and at least partially into the second structural member 62.

The friction welding tool 10 of the present invention can be used to join any number of structural members 60, 62, and each of the structural members 60, 62 can be formed of a variety of materials including, but not limited to, steel, titanium, aluminum, and alloys thereof. Also, each of the structural members 60, 62 can be formed of a different material, and the combination of materials can be a combination that is difficult or impossible to join using conventional, non-frictional welding techniques. The structural members 60, 62 can also be formed of materials that plasticize at high temperatures and are therefore typically welded at a limited speed when using conventional friction welding. For example, one or both of the structural members 60, 62 can be formed of a material that becomes plasticized at a temperature of at least 800° C., such as titanium and some types of steel.

The shank 20 is connected to a drive shaft (not shown), which is configured to be actuated by an actuator (not shown) such as an electric motor. The drive shaft is configured to urge the shank 20 in the longitudinal direction of the probe 22 so that the probe 22 is urged into the interface 64. A backing member such as an anvil 40 can be positioned opposite the structural members 60, 62 to resist the urging force of the probe 22 and shank 20 against the structural members 60, 62, so that the structural members 60, 62 are not deformed by the urging force. The drive shaft is also configured to rotate the shank 20 and the probe 22 and translate the shank 20 and the probe 22 along the interface 64, for example, as indicated by directions 46 and 44 respectively. As the probe 22 is rotated and translated through the interface 64, friction between the probe 22 and the structural members 60, 62 generates heat, which plasticizes material of the structural members 60, 62 near the interface 64 to form a plasticized region of material, which is mixed by the probe 22. As the plasticized material cools and hardens, a friction weld joint 66 is formed, joining the structural members 60, 62. Conventional friction welding is discussed in U.S. Pat. No. 5,460,317 to Thomas, et al., the entirety of which is incorporated herein by reference.

The shank 20 and the probe 22 can be formed as separate members which are connected, or the shank 20 and the probe 22 can comprise a single monolithic member. Additionally, the shank 20 and the probe 22 can be formed of a variety of materials. Preferably, at least the probe 22 comprises a refractory material, i.e., a material that resists melting during high temperature friction welding. The probe 22 is also preferably hard and abrasion resistant. For example, the probe 22 and/or the shank 20 can be formed of tungsten, molybdenum, titanium, nickel, steel, alloys thereof, mono- or poly-crystalline diamond, or nickel-based superalloys and is preferably strong at high operating temperatures. The probe 22 can also include a coating, such as a diamond film formed by vapor phase deposition, for example, to increase wear resistance or affect the frictional characteristics of the probe 22. The exterior of the probe 22 can be rough or smooth as is required to generate the necessary friction between the probe 22 and the structural members 60, 62 during welding.

An electromagnetic radiation source, such as a high intensity light source 50 as shown in FIG. 2, is configured to transmit electromagnetic radiation into the cavity 26. The high intensity light source 50 can comprise a laser, a high brightness laser diode, a laser diode array, an arc lamp, or other devices for transmitting a high power beam of light. Specifically, the light source 50 can comprise a conventional industrial laser such as a carbon dioxide laser, a carbon monoxide laser, a neodymium doped yttrium aluminum garnet (Nd:YAG) laser, or high-power semiconductor diodes. Alternatively, the electromagnetic radiation source can comprise sources for transmitting other types of radiation such as radio frequency radiation (RF). The amount of radiation generated by the radiation source can depend on, for example, the thickness and plasticizing temperature of the structural members 60, 62. For example, the light source 50 can generate between about 100 and 100,000 watts of radiation. Preferably, the light source 50 is located remotely from the shank 20 and the drive shaft, and the light from the light source 50 is directed into the cavity 26 by one or more mirrors or other reflective surfaces, hollow tubes, lenses, fiber optic cables, light ducts, or other light directing components. However, the light source 50 or other electromagnetic radiation source may be integrated with the shank 20 and/or the drive shaft if so desired.

The cavity 26, which is configured to receive the electromagnetic radiation from the electromagnetic radiation source, is at least partially defined by the absorption surface 32 of the probe 22. Preferably, the friction welding tool 10 is configured so that the longitudinal axis of the probe 22 extends through the cavity 26 and, in one embodiment, the cavity 26 is disposed such that the longitudinal axis extends through the center of the cavity 26 so that the cavity 26 is symmetric with respect to the longitudinal axis of the probe 22. While the cavity 26 may extend through the shank 20 with the absorption surface 32 being defined by the proximal end of the probe 22 that faces the shank 20, one cavity 26 typically extends through the shank 20 and through at least a portion of the probe 22. In this more typical embodiment, the absorption surface 32 is therefore defined by an interior surface of the probe 22 as shown in FIGS. 1 and 2. As also shown in FIGS. 1 and 2, the cavity 26 extends from the probe 22, through a probe aperture 30, into the shank 20, and through the shank 20 to a shank aperture 28. The cross-sectional size of the cavity 26 is generally larger in the shank 20 than in the probe 22, although the entire cavity 26 could have the same cross-sectional size, if desired. The interior surfaces of the cavity 26 absorb the electromagnetic radiation, and the cavity 26 can be formed or treated to control the absorptivity. For example, the absorption surface 32 can be coated with a highly absorptive material, such as a carbon-based coating, paint, or ceramic, so that the absorption surface 32 is more absorptive than the other surfaces of the cavity 26.

The light source 50 is configured to irradiate at least the absorption surface 32 and thereby heat the absorption surface 32 and, thus, the probe 22 and the structural members 60, 62. Preferably, the absorption surface 32 is configured to be oblique to the direction of the light received from the light source 50. For example, the absorption surface 32 can be conical and concave as shown in FIG. 1 or conical and convex. In other embodiments, the absorption surface 32 defines a curved surface such as a parabolic shape, one or more flat surfaces that are angled to be oblique to the light, or an irregular surface, such as a dimpled or rough surface. Preferably, the oblique configuration of the absorption surface 32 decreases the reflectance of light from the absorption surface 32 directly back to the light source 50. Instead, light that is reflected from the absorption surface 32 is directed toward other parts of the cavity 26. For example, light that is directed in the direction 54 of FIG. 1 and reflected partially by the conical absorption surface 32 is reflected primarily toward other parts of the absorption surface 32 where the light is partially absorbed and partially reflected again. Although some light may be subsequently reflected back toward the light source 50, the amount of light reflected to the light source 50 is reduced by preventing an initial reflectance from the absorption surface 32 directly to the light source 50, thereby reducing heating and wearing of the light source 50. Additionally, by increasing the number of reflections that occur within the cavity 26 before the light is reflected toward the light source 50, the heating effect of the light on the absorption surface 32 is increased. Further, because the absorption surface 32 is not perpendicular to the direction of the light emitted by the light source 50, the light is received over a larger area than the cross-sectional area of the beam path 52, thereby reducing the thermal stress on the probe 22 proximate to the absorption surface 32. The light source 50 can also be protected from an excess of reflected light by providing a highly absorptive surface on the absorption surface 32, protecting the light source 50 with a protective lens, or dispersing the light emitted to the absorption surface 32. Additionally, the shank aperture 28 and/or the probe aperture 30 can be smaller than the cross-sectional size of the rest of the cavity 26 to prevent light from escaping from the cavity 26. One or more optical devices, such as mirrors, lenses, filters, and the like can also be used to adjust the focus, beam width, dispersion, and coherence of the light received by the absorption surface 32.

The friction welding tool 10 shown in FIG. 3 comprises an electromagnetic radiation source that is a RF generator 50a and a probe 22a that is a friction welding blade. As described above in connection with the cutting tool 10 of FIG. 2, the RF generator 50a is configured to irradiate the absorption surface 32 to provide additional heat to the probe 22a. A waveguide 56a, which can comprise a coaxial cable or hollow pipe, directs the RF radiation from the generator 50a to the cavity 26 and towards the absorption surface 32 of the probe 22a, and a RF lens 58a focuses the radiation through the rectangular probe aperture 30. The probe 22a can be inserted or urged into the interface 64 between the structural members 60, 62 and reciprocatingly actuated to generate friction between the probe 22a and the structural members 60, 62 to plasticize the material of the structural members 60, 62, mix the plasticized material, and thereby form the weld joint 66 to join the structural members 60, 62. The drive shaft of the tool 10 is connected to a reciprocatable actuator (not shown) and configured to urge the probe 22a into the interface 64, reciprocate the probe 22a in directions 48, and translate the probe 22a in the direction 44. Although the longitudinal axis of the tool 10 is shown parallel to the probe 22a and the interface 64, one or more of the shank 20, drive shaft, and the light source 50 can be positioned at an angle relative to the probe 22a, for example, perpendicular thereto. Additionally, the probe 22a can be positioned at an angle to the interface 64, as is known in the art.

In one typical method of operation, the friction welding tool 10 is used to join the two structural members 60, 62 by forming the friction weld joint 66. The structural members 60, 62 are positioned to form the interface 64 therebetween, and urged together. The friction welding probe 22, 22a is urged into the structural members 60, 62, for example, by urging the probe 22, 22a in the longitudinal direction of the probe 22, 22a and into the interface 64. The friction welding probe 22, 22a is actuated, for example, by using the actuator to rotate or reciprocate the shank 20 and the probe 22, 22a and translate the shank 20 and the probe 22, 22a along the interface 64. The electromagnetic radiation source 50, 50a emits radiation, which is directed toward, and irradiates, the absorption surface 32. The radiation received by the absorption surface 32 from the electromagnetic radiation source 50, 50a heats the absorption surface 32 and is thermally communicated throughout the probe 22, 22a, for example, through conduction between the absorption surface 32 and the probe 22, 22a. The heat energy received by the probe 22, 22a from the electromagnetic radiation supplements the frictional heat generated by the probe 22, 22a so that the probe 22, 22a and the structural members 60, 62 are heated at a faster rate than would result by frictional heating alone. Thus, the plasticized region is formed in the structural members 60, 62 at a faster rate and the probe 22, 22a can be translated more easily through the structural members 60, 62 and at a faster rate than would be possible if the probe 22, 22a were heated by only the frictional heat.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for friction welding at least one structural member, comprising:
   a shank; and
   a probe connected to said shank and configured to be actuated by said shank for friction welding the at least one structural member,
   wherein said probe defines an absorption surface and a cavity extending to said absorption surface, wherein said absorption surface is configured to receive electromagnetic radiation and thereby heat said probe.

2. An apparatus for friction welding at least one structural member according to claim 1, further comprising a rotatable actuator in rotational communication with said shank such that said rotatable actuator can rotate said shank about a longitudinal axis of said probe and wherein said probe comprises a friction stir welding pin.

3. An apparatus for friction welding at least one structural member according to claim 1, further comprising a reciprocatable actuator in reciprocatable communication with said shank and wherein said probe comprises a friction stir welding blade.

4. An apparatus for friction welding at least one structural member according to claim 1, further comprising an electromagnetic radiation source configured to irradiate said absorption surface and thereby heat said probe.

5. An apparatus for friction welding at least one structural member according to claim 4, wherein said electromagnetic radiation source is a light source configured to direct light toward said absorption surface.

6. An apparatus for friction welding at least one structural member according to claim 5, further comprising a fiber optic cable configured to direct light emitted by said light source toward said absorption surface.

7. An apparatus for friction welding at least one structural member according to claim 4, wherein said electromagnetic radiation source is a radio frequency generator configured to direct radio frequency radiation toward said absorption surface.

8. An apparatus for friction welding at least one structural member according to claim 7, further comprising a waveguide configured to direct the electromagnetic radiation emitted by said radio frequency generator toward said absorption surface.

9. An apparatus for friction welding at least one structural member according to claim 4, wherein said cavity extends in a longitudinal direction through at least a portion of said probe and said electromagnetic radiation source is configured to emit electromagnetic radiation in the longitudinal direction of said probe.

10. An apparatus for friction welding at least one structural member according to claim 9, wherein said cavity extends through said shank.

11. An apparatus for friction welding at least one structural member according to claim 10, wherein said cavity defines a larger cross-sectional size in said shank than in said probe.

12. An apparatus for friction welding at least one structural member according to claim 1, wherein said absorption surface is oblique to a propagation direction of the electromagnetic radiation received from the electromagnetic radiation source.

13. An apparatus for friction welding at least one structural member according to claim 1, wherein said absorption surface is curved.

14. An apparatus for friction welding at least one structural member according to claim 1, wherein said absorption surface is conical.

15. A friction welding tool for friction welding at least one structural member, the friction welding tool comprising:
   a shank;
   a probe connected to said shank, wherein said probe defines an internal absorption surface, and said probe and said shank cooperate to define a cavity extending to said absorption surface;
   an actuator configured to actuate said shank and said probe and thereby weld the at least one structural member; and
   an electromagnetic radiation source configured to irradiate said absorption surface and thereby heat said probe, wherein said cavity extends in a longitudinal direction through a portion of said probe and said electromagnetic radiation source is configured to emit electromagnetic radiation in the longitudinal direction of said probe.

16. A friction welding tool for friction welding at least one structural member according to claim 15, wherein said probe comprises a friction stir welding pin and wherein said actuator is a rotatable actuator in rotational communication with said shank such that said rotatable actuator can rotate said pin about a longitudinal axis of said pin.

17. A friction welding tool for friction welding at least one structural member according to claim 15 wherein said probe comprises a friction stir welding blade and wherein said actuator is a reciprocatable actuator in reciprocatable communication with said shank such that said actuator can reciprocate said blade in a direction parallel to the blade.

18. A friction welding tool for friction welding at least one structural member according to claim 15, wherein said electromagnetic radiation source is a light source configured to direct light toward said absorption surface.

19. A friction welding tool for friction welding at least one structural member according to claim 15, further comprising a fiber optic cable configured to direct light emitted by said light source toward said absorption surface.

20. A friction welding tool for friction welding at least one structural member according to claim 15, wherein said electromagnetic radiation source is a radio frequency generator configured to direct radio frequency radiation toward said absorption surface.

21. A friction welding tool for friction welding at least one structural member according to claim 20, further comprising a waveguide configured to direct the electromagnetic radiation emitted by said radio frequency generator toward said absorption surface.

22. A friction welding tool for friction welding at least one structural member according to claim 15, wherein said absorption surface is oblique to a propagation direction of electromagnetic radiation emitted from said electromagnetic radiation source.

23. A friction welding tool for friction welding at least one structural member according to claim 15, wherein said absorption surface is curved.

24. A friction welding tool for friction welding at least one structural member according to claim 15, wherein said absorption surface is conical.

25. A method of friction welding at least one structural member, the method comprising:

urging a friction welding probe into the at least one structural member;

actuating the friction welding probe to frictionally weld the at least one structural member; and irradiating an absorption surface of the probe with electromagnetic radiation, thereby heating the probe.

26. A method of friction welding at least one structural member according to claim 25, further comprising providing at least one structural member formed of a material that plasticizes at a temperature of at least 800° C., and wherein said irradiating step comprises heating at least part of the at least one structural member to a temperature of at least 800° C.

27. A method of friction welding at least one structural member according to claim 25, wherein the probe is a friction stir welding pin and wherein said actuating step comprises rotating the pin about a longitudinal axis and wherein said irradiating step comprises directing electromagnetic radiation in the longitudinal direction of the pin and toward the pin.

28. A method of friction welding at least one structural member according to claim 25, wherein the probe is a friction welding blade and said actuating step comprises reciprocating the blade in an interface defined by the at least one structural member.

29. A method of friction welding at least one structural member according to claim 25, wherein said irradiating step comprises irradiating the probe through a cavity defined by the probe and wherein the absorption surface is an internal surface that at least partially defines the cavity.

30. A method of friction welding at least one structural member according to claim 25, wherein said irradiating step comprises directing the electromagnetic radiation in a direction oblique relative to the absorption surface.

31. A method of friction welding at least one structural member according to claim 25, wherein said irradiating step comprises irradiating said absorption surface with light.

32. A method of friction welding at least one structural member according to claim 25, wherein said irradiating step comprises irradiating said absorption surface with radio frequency radiation.

* * * * *